US012573204B2

(12) United States Patent
Agarwal et al.

(10) Patent No.: US 12,573,204 B2
(45) Date of Patent: Mar. 10, 2026

(54) PASSENGER INTENT PREDICTION FOR AUTOMATIC CAR ENTRY SYSTEM

(71) Applicant: Honda Motor Co., Ltd., Tokyo (JP)

(72) Inventors: Nakul Agarwal, San Francisco, CA (US); Pero Subasic, San Jose, CA (US); Kikuo Fujimura, Palo Alto, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/801,020

(22) Filed: Aug. 12, 2024

(65) Prior Publication Data

US 2026/0045094 A1 Feb. 12, 2026

(51) Int. Cl.
| | |
|---|---|
| *G06V 20/56* | (2022.01) |
| *G06F 3/01* | (2006.01) |
| *G06T 7/20* | (2017.01) |
| *G06T 7/70* | (2017.01) |
| *G06V 10/25* | (2022.01) |
| *G06V 10/764* | (2022.01) |

(52) U.S. Cl.
CPC .............. *G06V 20/56* (2022.01); *G06F 3/013* (2013.01); *G06T 7/20* (2013.01); *G06T 7/70* (2017.01); *G06V 10/25* (2022.01); *G06V 10/764* (2022.01); *G06T 2207/30241* (2013.01)

(58) Field of Classification Search
None
See application file for complete search history.

(56) References Cited

U.S. PATENT DOCUMENTS

2021/0155266 A1* 5/2021 Sun .................. B60W 60/0027
2021/0279475 A1* 9/2021 Tusch ................ H04L 63/0861

OTHER PUBLICATIONS

Will Your Smartphone Replace Your Car Key?—consumerreports. org. https://www.consumerreports. org/automotive-technology/will-your-smartphone-replace-your-car-key-virtual-key/. [Accessed Mar. 16, 2024].
Volvo Cars Tests Replacing Keys with Smart Phone App—media. volvocars.com. https://www.media. volvocars.com/us/en-us/media/pressreleases/173880/volvo-cars-tests-replacing-keys-with-smart-phone-app. [Accessed Mar. 16, 2024].

(Continued)

*Primary Examiner* — Samira Monshi
(74) *Attorney, Agent, or Firm* — Rankin, Hill & Clark LLP

(57) ABSTRACT

A vehicle access control system for predicting a user's intent to enter a vehicle is achieved through an analysis of video data captured by a plurality of external cameras mounted on the vehicle. The plurality of cameras capture the video data as the user approaches the vehicle. The system includes a processor with an intent prediction module. A memory stores instructions which, when executed by the processor, enable the processor to analyze visual cues of the user from the video data, including body posture, gaze direction, and proximity to the vehicle. Furthermore, the processor extracts user data including a trajectory, head orientation, and body orientation of the user from the video data. The intent prediction module, using the user data, predicts the intent of the user to enter the vehicle and triggers a corresponding vehicle entry action.

20 Claims, 5 Drawing Sheets

(56) References Cited

OTHER PUBLICATIONS

Feng-Ju Chang, Anh Tuan Tran, Tal Hassner, Iacopo Masi, Ram Nevatia, and Gerard Medioni. Faceposenet: Making a case for landmark-free face alignment. In Proceedings of the IEEE International Conference on Computer Vision Work-shops, pp. 1599-1608, 2017.

Kyunghyun Cho, Bart Van Merrienboer, Caglar Gulcehre, Dzmitry Bahdanau, Fethi Bougares, Holger Schwenk, and Yoshua Bengio. Learning phrase representations using rnn encoder-decoder for statistical machine translation. arXiv preprint arXiv:1406.1078, 2014.

Wonsuk Choi, Minhye Seo, and Dong Hoon Lee. Sound-proximity: 2-factor authentication against relay attack on passive keyless entry and start system. Journal of Advanced Transportation, 2018:1-13, 2018.

Jinwei Gu, Xiaodong Yang, Shalini De Mello, and Jan Kautz. Dynamic facial analysis: From bayesian filtering to recurrent neural network. In Proceedings of the IEEE conference on computer vision and pattern recognition, pp. 1548-1557, 2017.

Amit Kumar, Azadeh Alavi, and Rama Chellappa. Ke-pler: Keypoint and pose estimation of unconstrained faces by learning efficient h-cnn regressors. In 2017 12th IEEE international conference on automatic face & gesture recognition (fg 2017), pp. 258-265. IEEE, 2017.

Wei Liu, Dragomir Anguelov, Dumitru Erhan, Christian Szegedy, Scott Reed, Cheng-Yang Fu, and Alexander C Berg. Ssd: Single shot multibox detector. In Computer Vision—ECCV 2016: 14th European Conference, Amsterdam, The Netherlands, Oct. 11-14, 2016, Proceedings, Part I 14, pp. 21-37. Springer, 2016.

Dushyant Mehta, Oleksandr Sotnychenko, Franziska Mueller, Weipeng Xu, Srinath Sridhar, Gerard Pons-Moll, and Christian Theobalt. Single-shot multi-person 3d pose estimation from monocular rgb. In 2018 International Conference on 3D Vision (3DV), pp. 120-130. IEEE, 2018.

Daniil Osokin. Real-time 2d multi-person pose esti-mation on cpu: Lightweight openpose. arXiv preprint arXiv:1811.12004, 2018.

Massimiliano Patacchiola and Angelo Cangelosi. Head pose estimation in the wild using convolutional neural networks and adaptive gradient methods. Pattern Recognition, 71: 132-143, 2017.

Rajeev Ranjan, Vishal M Patel, and Rama Chellappa. Hy-perface: A deep multi-task learning framework for face detection, landmark localization, pose estimation, and gender recognition. IEEE transactions on pattern analysis and ma-chine intelligence, 41(1):121-135, 2017.

Rajeev Ranjan, Swami Sankaranarayanan, Carlos D Castillo, and Rama Chellappa. An all-in-one convolutional neural network for face analysis. In 2017 12th IEEE international conference on automatic face & gesture recognition (FG 2017), pp. 17-24. IEEE, 2017.

Nataniel Ruiz, Eunji Chong, and James M Rehg. Fine-grained head pose estimation without keypoints. In Proceedings of the IEEE conference on computer vision and pattern recognition workshops, pp. 2074-2083, 2018.

Chien-Yao Wang, Alexey Bochkovskiy, and Hong-Yuan Mark Liao. Yolov7: Trainable bag-of-freebies sets new state-of-the-art for real-time object detectors. In Proceedings of the IEEE/CVF conference on computer vision and pattern recognition, pp. 7464-7475, 2023.

Syed Rizvi, Jarrett Imler, Luke Ritchey, and Michael Tokar. Securing pkes against relay attacks using coordinate tracing and multi-factor authentication. In 2019 53rd Annual Conference on Information Sciences and Systems (CISS), pp. 1-6. IEEE, 2019.

Juan Wang, Karim Lounis, and Mohammad Zulkernine. Security features for proximity verification. In 2019 IEEE 43rd Annual Computer Software and Applications Conference (COMPSAC), pp. 592-597. IEEE, 2019.

* cited by examiner

PASSENGER INTENT PREDICTION FOR AUTOMATIC CAR ENTRY SYSTEM

BACKGROUND

The integration of advanced sensing and predictive technologies in automotive systems has enhanced vehicle functionality and user interaction. Traditional systems require physical keys or devices for vehicle entry, which can be cumbersome and insecure. With the advent of autonomous and semi-autonomous vehicles, there is a need for more intuitive and secure methods of vehicle access control that can adapt dynamically to the intentions and movements of users. The present application introduces a system that utilizes novel visual processing techniques and machine learning to predict a user's intent to enter a vehicle. This system is particularly configured for scenarios where users approach a vehicle with varying postures, gaze directions, and trajectories, necessitating a robust method to predict intent accurately and ensure secure and convenient vehicle access.

BRIEF DESCRIPTION

According to one aspect, a vehicle access control system for predicting a user's intent to enter a vehicle is provided. The system includes a plurality of external cameras, a processor, and a memory. The plurality of external cameras are mounted on the vehicle capturing video data of the user approaching the vehicle. The processor includes an intent prediction module. The memory stores instructions that when executed by the processor enable the processor to analyze visual cues of the user from the video data, including body posture, gaze direction, and proximity to the vehicle. Furthermore, the processor extracts user data including a trajectory, head orientation, and body orientation of the user from the video data. The intent prediction module predicts an intent of the user to enter the vehicle based on the user data and triggers a vehicle entry action.

According to another aspect, a computer-implemented method for predicting a user's intent to enter a vehicle is provided. The method includes capturing video data of the user approaching the vehicle using a plurality of external cameras mounted on the vehicle. The method includes analyzing visual cues in the video data including body posture, gaze direction, and proximity to the vehicle. The method includes extracting user data including a trajectory, head orientation, and body orientation of the user from the video data. The method includes predicting an intent of the user to enter the vehicle based on the user data. The method further includes triggering an automatic vehicle entry action based on the intent of the user.

According to yet another aspect, a vehicle is provided including a plurality of external cameras, a processor, a memory, and a vehicle entry control system. The plurality of external cameras are mounted at locations around the vehicle for capturing video data. The processor includes an intent prediction module. The memory stores one or more instructions that when executed by the processor enable the processor to analyze visual cues of a user from the video data, which include at least body posture, gaze direction, and proximity to the vehicle. Furthermore, the processor extracts user data including trajectory, head orientation, and body orientation data from the video data. The intent prediction module utilizes the user data to predict an intent of the user to enter the vehicle. The vehicle entry control system is responsive to the intent prediction module, and is configured to automatically execute vehicle entry actions giving the user access to the vehicle.

DETAILED DESCRIPTION

Figure 1:
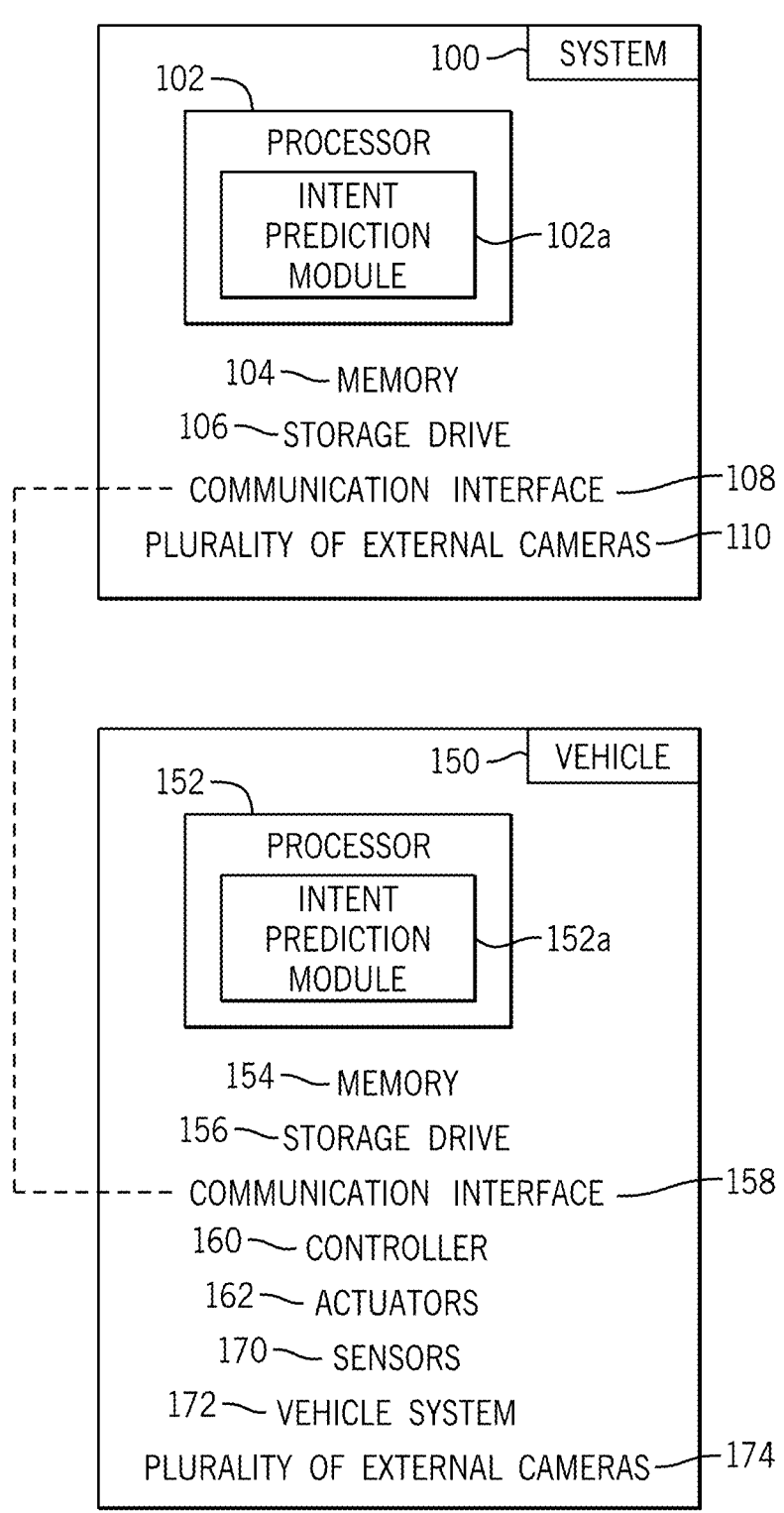
FIG. 1 is an exemplary component diagram of a vehicle access control system, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted, or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components.

The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle or ego-vehicle, and/or driving. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pre-tensioning system, a monitoring system, a passenger detection system, a vehicle suspension system, a vehicle seat configuration system, a vehicle cabin lighting system, an audio system, a sensory system, among others.

An "agent", as used herein, may be a machine that moves through or manipulates an environment. Exemplary agents may include robots, vehicles, or other self-propelled machines. The agent may be autonomously, semi-autonomously, or manually operated.

A "multi-stream input", as used herein, may be multiple data sources or streams that feed into a predictive model to predict, for example, a user's intent to enter a vehicle. These data sources or streams represent different types of sensory inputs or extracted features.

FIG. 1 illustrates an exemplary component diagram of a vehicle access control system 100, according to one aspect. The system 100 can be implemented onboard a vehicle 150 or an agent controlled remotely, for example, from an external device. The system 100 includes a processor 102, memory 104, storage drive 106, communication interface 108, and a plurality of external cameras 110. The processor 102 includes an intent prediction module 102a.

The vehicle 150 may comprise a processor 152, memory 154, storage drive 156, a communication interface 158, a controller 160, actuators 162, sensors 170, one or more vehicle systems 172, and a plurality of external cameras 174. The processor 152 may include an intent prediction module 152a.

Although primarily described here using the processor 102, it should be noted that any processing, computations, predictions, etc., may be conducted by either the system's 100 processor 102 and relayed to the vehicle 150 via the communication interfaces 108, 158, or by the processor 152 of the vehicle 150. Thus, the respective components can be communicatively coupled and/or in computer communication with each other.

At a high level, the vehicle access control system 100 uses the plurality of external cameras 110 mounted on the vehicle 150 to capture video data as a user approaches the vehicle 150. The memory 104 stores instructions that, when executed by the processor 102, enable the processor 102 to analyze various visual cues from the video data, such as the user's body posture, gaze direction, and proximity to the vehicle 150. Furthermore, the processor 102 extracts user data representative of physical indicators like the trajectory of the user's movement, head orientation, and body orientation from the video data. Based on the user data, the intent prediction module 102a within the system 100 predicts the user's intent to enter the vehicle 150. Once the intent is predicted, the system 100 triggers an appropriate vehicle entry action, thus enhancing user convenience and the overall efficiency of the vehicle's 150 entry process.

Figure 2:
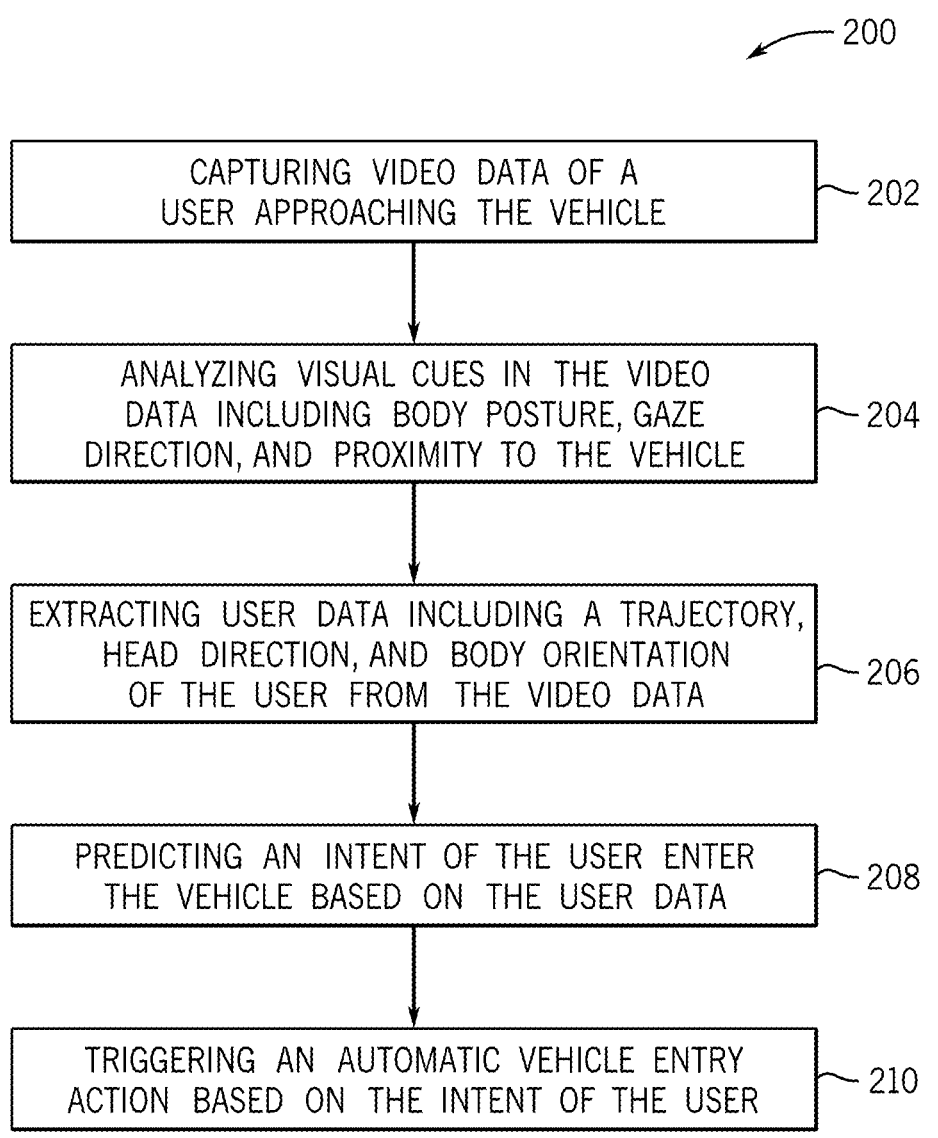
FIG. 2 is an exemplary flow diagram of a computer-implemented method for predicting a user's intent to enter a vehicle, according to one aspect.

FIG. 2 is an exemplary flow diagram of a computer-implemented method 200 for predicting a user's intent to enter a vehicle 150, according to one aspect. For example, the computer-implemented method 200 includes, at 202, capturing video data of a user approaching the vehicle 150 using a plurality of external cameras 110 mounted on the vehicle 150. The method 200 further includes, at 204, analyzing visual cues in the video data including body posture, gaze direction, and proximity to the vehicle 150 and, at 206, extracting user data including a trajectory, head orientation, and body orientation of the user from the video data. Furthermore, the method includes, at 208, predicting an intent of the user to enter the vehicle 150 based on the user data and, at 210, triggering an automatic vehicle entry action based on the intent of the user.

VISUAL CUE DATA ACQUISITION

Figure 3:
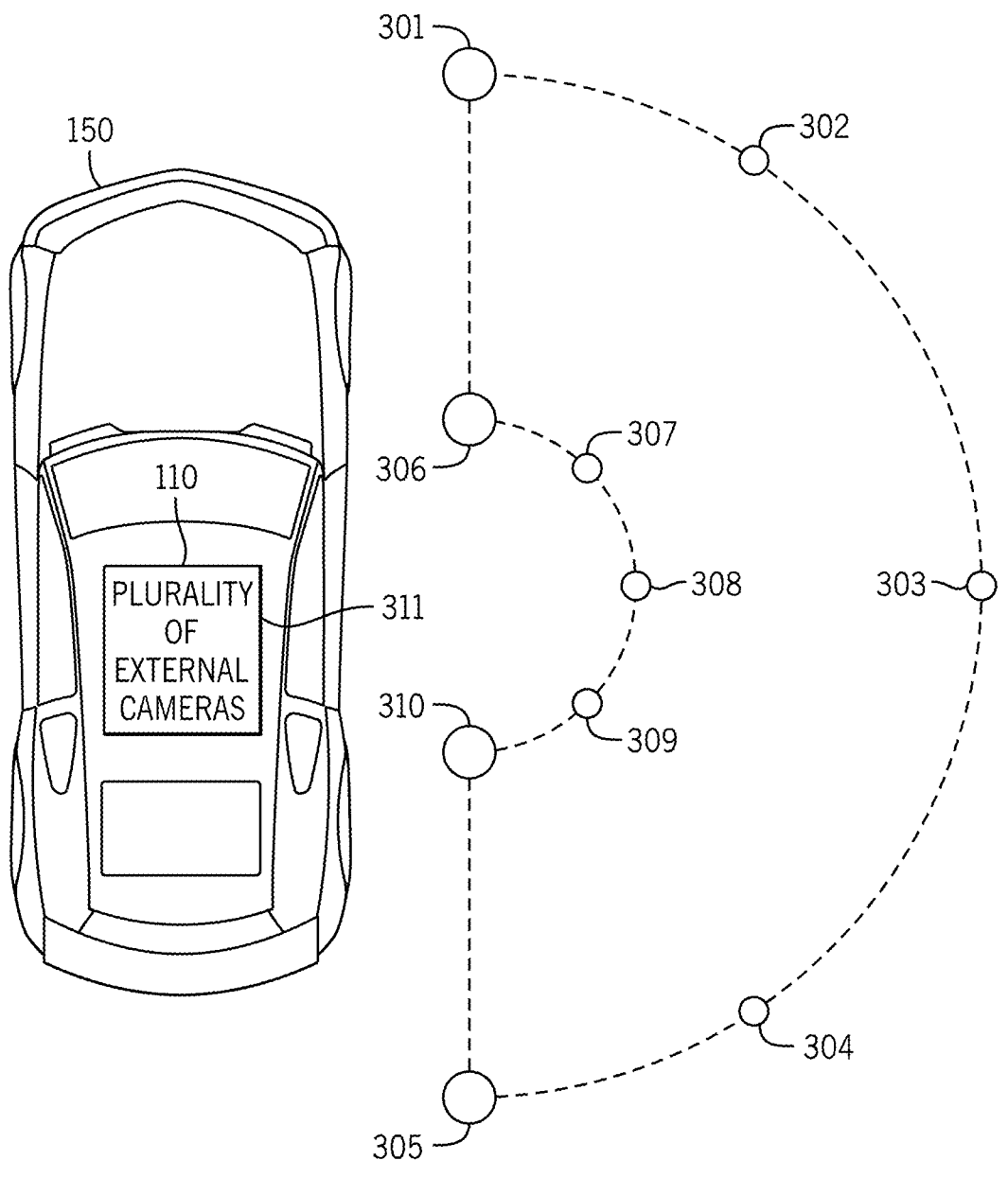
FIG. 3 is an exemplary illustration of a setup for data collection associated with the vehicle access control system of FIG. 1, according to one aspect.

FIG. 3 illustrates an exemplary setup for visual cue data collection associated with the system 100. The plurality of external cameras 110 are mounted on the vehicle 150 in a manner that allows them to face the user or any direction from which the user might approach the vehicle 150. The setup is designed to capture diverse walking patterns by generating multiple plausible trajectories for the user, each trajectory following a route defined by numbers and including three numbered points: a starting point, a relay point, and a goal point. The reference numbers 301 through 310 represent various points at the side of the vehicle 150 that serve as starting or relay points in the user's trajectory. The goal point 311 is set to at least one of the plurality of external cameras' 110 positions when the user intends to enter the vehicle 150. It should be noted that in the system 100, there could be many more points having varied positioning, and FIG. 3 is merely an example.

This configuration allows the processor 102 to process a sequence of images to extract user data such as the user's trajectory, head orientation, and body orientation. This user data, associated with visual cues, can then be used to assess the user's intent to enter the vehicle 150. The user data is fed into a Gated Recurrent Unit (GRU) neural network utilized by the intent prediction module 102*a* to be encoded and decoded. As explained in further detail below, the encoding results in the acquisition of a final hidden state, and the final hidden state is decoded to predict the user's binary intent by combining logits derived from the model.

MULTI-STREAM INPUTS

Multi-Stream Inputs facilitate an accurate determination of the user's intent through the input of various visual cues, including the user's position, head orientation, and body orientation. The positional visual cue aims to estimate the user's walking pattern or trajectory. This is achieved by detecting the user's 2D position using bounding boxes, implemented through object detection algorithms such as YOLO (You Only Look Once) and SSD (Single Shot MultiBox Detector). These bounding boxes are tracked across different frames to compile a comprehensive trajectory of the user's movement, providing detailed spatial analysis.

As the user approaches the vehicle 150, the direction of the user's gaze serves as an indicator of intent. If the user's gaze is directed toward a door handle or an interior of the vehicle 150, it suggests an intention to enter. Conversely, if the gaze is directed toward the surroundings of the vehicle 150 or away from it, it may indicate hesitation or a different purpose, such as merely passing by or waiting near the vehicle 150. Techniques such as Faceposenet and Kepler are employed to estimate head orientation, which is categorized in a discrete format for model interpretation. This format determines whether the user is looking towards the vehicle 150 based on whether a head pose of the user falls within a predetermined angular range relative to a center of at least one of the plurality of external cameras 110.

In addition to head orientation, 3D body orientation serves as another visual cue for gauging the user's intent to enter the vehicle 150. This orientation is estimated by detecting up to 18 types of key body points including ears, eyes, nose, neck, shoulders, elbows, wrists, hips, knees, and ankles. Given a 3D human pose, the body orientation b can be computed as:

$$b = d \times c, \tag{1}$$

Where c represents a shoulder direction, defined by the vector from the right shoulder to the left, and d represents a torso direction, defined by the vector from the midpoint of the left and right shoulder joints to the midpoint of the left and right hip joints. Like head orientation, body orientation is configured in a discrete format, aiding in the ability to accurately predict the user's intentions. These multi-stream inputs, when synthesized, provide a robust framework for accurately predicting the user's intent to interact with the vehicle 150, enhancing user-vehicle interaction dynamics significantly.

ARCHITECTURE

To predict the intention of the user to enter the vehicle 150, the GRU neural network architecture is constructed. GRUs are a variant of recurrent neural networks (RNNs) that are adept at processing sequential data, which is fundamental in applications like time series prediction, natural language processing, and speech recognition. GRUs enhance the traditional RNNs by incorporating gating mechanisms to mitigate a vanishing gradient problem, making them more effective for long sequence data processing.

According to this embodiment, the GRU neural network processes a set of N=5 values representing sequential time steps of the user's position, head/face orientation, and body orientation. These positions are input into the GRU neural network to generate a binary response through training using a cross-entropy loss. More specifically, the set of values from each modality are input into parallel branches of the network, and the final response is derived by combining them. This method processes the user's sequential data to predict their intention.

For each of these modalities, the user positions are defined by bounding box coordinates (xt, yt, wt, ht), where xt and yt denote center coordinates, and wt and ht represent width and height, respectively, of the bounding box at timestep t. Head/Face orientation is indicated by ft and body orientation by bt at timestep t, both computed with an axis of at least one of the plurality of external cameras 110 as a reference.

An input modality is denoted by V, which corresponds to position, head/face orientation, or body orientation. Each modality V is initially processed through a linear layer to generate an embedding E, expressed as:

$$E = nn.\text{Linear}(V), \tag{2}$$

Where nn. Linear refers to a multi-layer perceptron (MLP).

This embedding E, along with an initialized hidden state $h_{init}$ (initially set to zero), is fed into a GRU encoder specific to each modality. The final hidden state $h_{final}$ obtained from the GRU encoder is defined as:

$$h_{final} = GRU(E, h_{init}), ( \tag{3}$$

This final hidden state from each modality is then passed through an intention prediction decoder, which is another MLP, followed by a Softmax layer to generate logits. These logits are combined to compute an intent probability for each modality:

$$p(I_{modality}) = \text{Softmax}(nn.\text{Linear}(h_{final})) \tag{4}$$

The probabilities from each modality are then averaged to derive a final intention probability:

$$p(I) = \frac{1}{3}(p(I_{pos}) + p(I_{face}) + p(I_{body})) \tag{5}$$

This approach utilizes the strengths of each individual cue-position, head/face orientation, and body orientation—to build a comprehensive understanding of user intent. The model is trained using a cross-entropy loss L, which is calculated over a batch of size R as follows:

$$\mathcal{L} = -\frac{1}{R}\sum_{i=1}^{R} y\log(p(I_i)) + (1-y)\log(1-p(I_i)), \quad (6)$$

Here, y represents the ground truth binary indicator (0 or 1) for the correct classification, and p (I) is the final predicted probability distribution. This strategy enables the model to effectively learn from each individual modality and predict the user's intent to enter the vehicle 150 with high accuracy.

Figure 4:
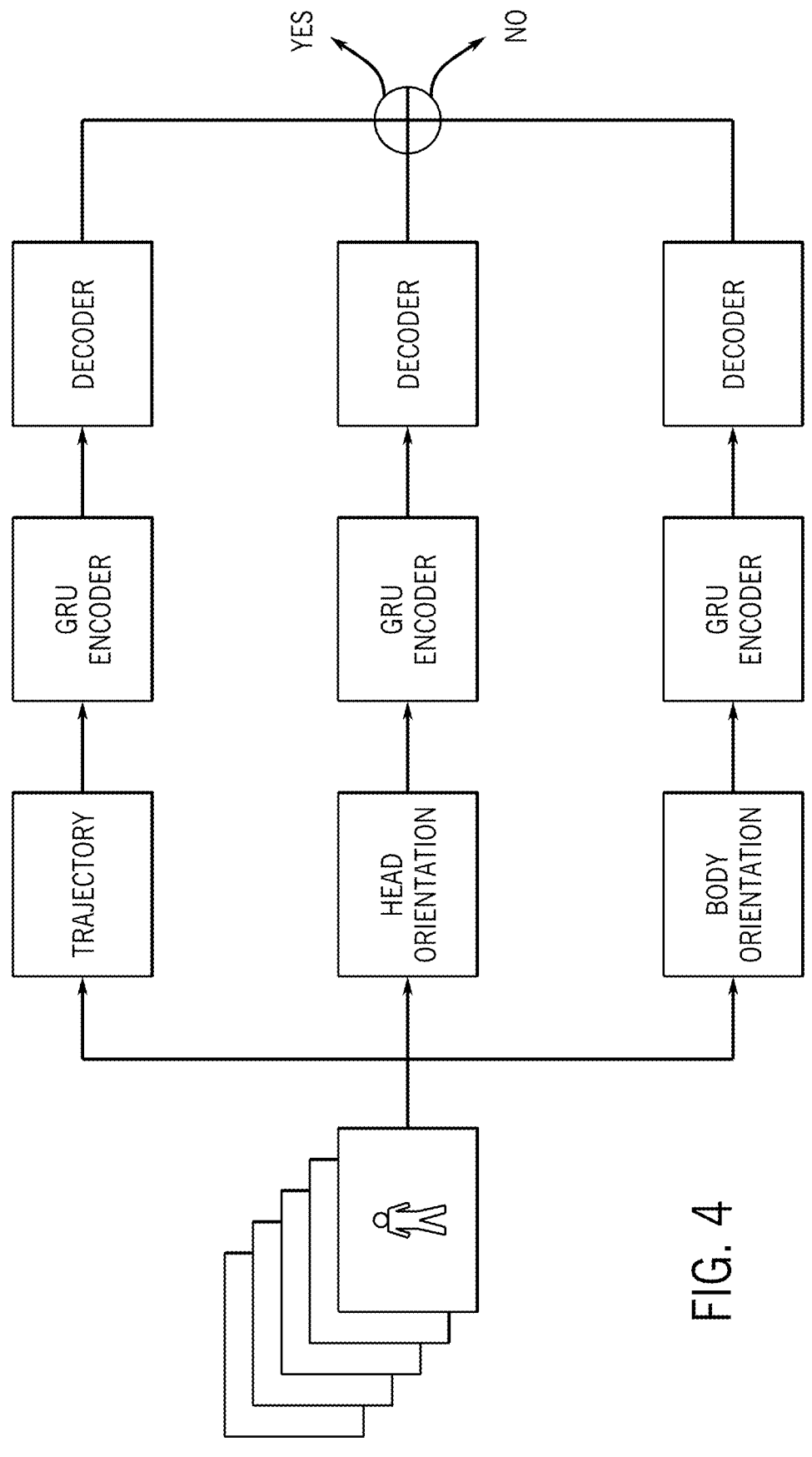
FIG. 4 is an exemplary illustration of neural network architecture associated with the vehicle access control system of FIG. 1, according to one aspect.

FIG. 4 illustrates the above discussed neural network architecture of the intent prediction module 102a, which initially processes the sequence of images from the video data to extract the user data pertaining to the user's trajectory, head orientation, and body orientation. This extracted multi-stream input is then fed into the GRU encoder to obtain the final hidden state, which refers to the last output state of the GRU neural network after processing these inputs. These hidden states are passed through the intention prediction decoder to obtain the logits, which are combined to predict the binary intent of the user to enter the vehicle 150 (i.e., yes or no).

VEHICLE ENTRY ACTION

If the user's intent to enter the vehicle 150 is affirmed by the intent prediction module 102a, an automated vehicle entry action is triggered to facilitate access to the vehicle 150. For example, when the intent prediction module 102a determines that the user's final intent probability exceeds a predefined threshold, the automatic vehicle entry action is initiated. The threshold or criteria for triggering these actions can vary depending on the system's 100 calibration and a confidence level set for prediction accuracy. Upon affirming the user's intent to enter the vehicle 150, the processor 102 may send a signal via its communication interface 108 to the vehicle's communication interface 158, which then relays this signal to the actuators 162 of the vehicle 150 and/or other vehicle systems 172 as necessary to execute the appropriate automatic vehicle entry action.

Furthermore, as an automatic vehicle entry action, the system 100 can be configured to facilitate an automated trunk opening when it detects the user approaching with both hands occupied. As the user nears the vehicle 150, the plurality of external cameras 110 capture the video data, which is analyzed by the processor 102. The system identifies the user's burdened posture and the presence of, for example, bags, focusing on the user's hand occupancy and object recognition. The intent prediction module 102a interprets these visual cues and predicts that the user intends to access the trunk of the vehicle 150 rather than the passenger compartment of the vehicle 150. Upon this determination, the system 100 triggers the trunk to open automatically.

Furthermore, the system 100 can be configured to accommodate scenarios in which the user is accompanied by a child or the like. When the plurality of external cameras 110 detect the user approaching the vehicle 150 with the child, the system's 100 processor 102 analyzes both the user and the child's positions and orientations. The intent prediction module 102a assesses these inputs, particularly the child's proximity relative to the user and the vehicle 150. If the system 100 identifies the child's intent to enter the vehicle 150, priority is given to facilitating the child's access. This adaptive response showcases the system's 100 capability to modify its actions based on the nuanced dynamics of the user's behavior and situational context, thereby ensuring a safer and more user-friendly vehicle entry process for all passengers.

OTA UPDATES

Wireless connectivity through networks such as Wi-Fi or cellular connections plays a role in the modern paradigm of providing Over-the-Air (OTA) updates. This technology is employed across various embedded systems, including mobile phones, tablets, and increasingly in vehicles, highlighting its widespread adoption. Given the significance of OTA updates, there is an initiative to regularly update a vehicle's systems by iteratively enhancing the algorithms responsible for user interaction and vehicle control.

One such enhancement involves incorporating realistic data into the training process of the algorithm. Historically, models were trained on data collected under controlled conditions. However, the vehicle 150 and its system 100 described herein may be configured to automatically collect data at predetermined times using the vehicle's 150 own systems. This real-world data yields a more robust dataset as it encompasses a range of user interactions and environmental conditions absent in constrained environments.

Utilizing realistic, continuously gathered data not only enhances the effectiveness of the model but also ensures its practical utility in real-world scenarios. This approach aligns with the growing trend of smart, connected vehicles and increases the system's 100 capacity to accommodate new and unforeseen user behaviors and environmental interactions, thus maintaining a state of continual improvement and adaptation.

The aspects performed by the processor 102 discussed above involve processor-executable instructions configured to implement one aspect of the techniques presented herein. An implementation includes a computer-readable medium, such as a CD-R, DVD-R, flash drive, a platter of a hard disk drive, etc., on which is encoded computer-readable data. This encoded computer-readable data, such as binary data including a plurality of zero's and one's, in turn includes a set of processor-executable computer instructions configured to operate according to one or more of the principles set forth herein. In this implementation, the processor-executable computer instructions may be configured to perform a method, such as the computer-implemented method 200 of FIG. 2. In another aspect, the processor-executable computer instructions may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
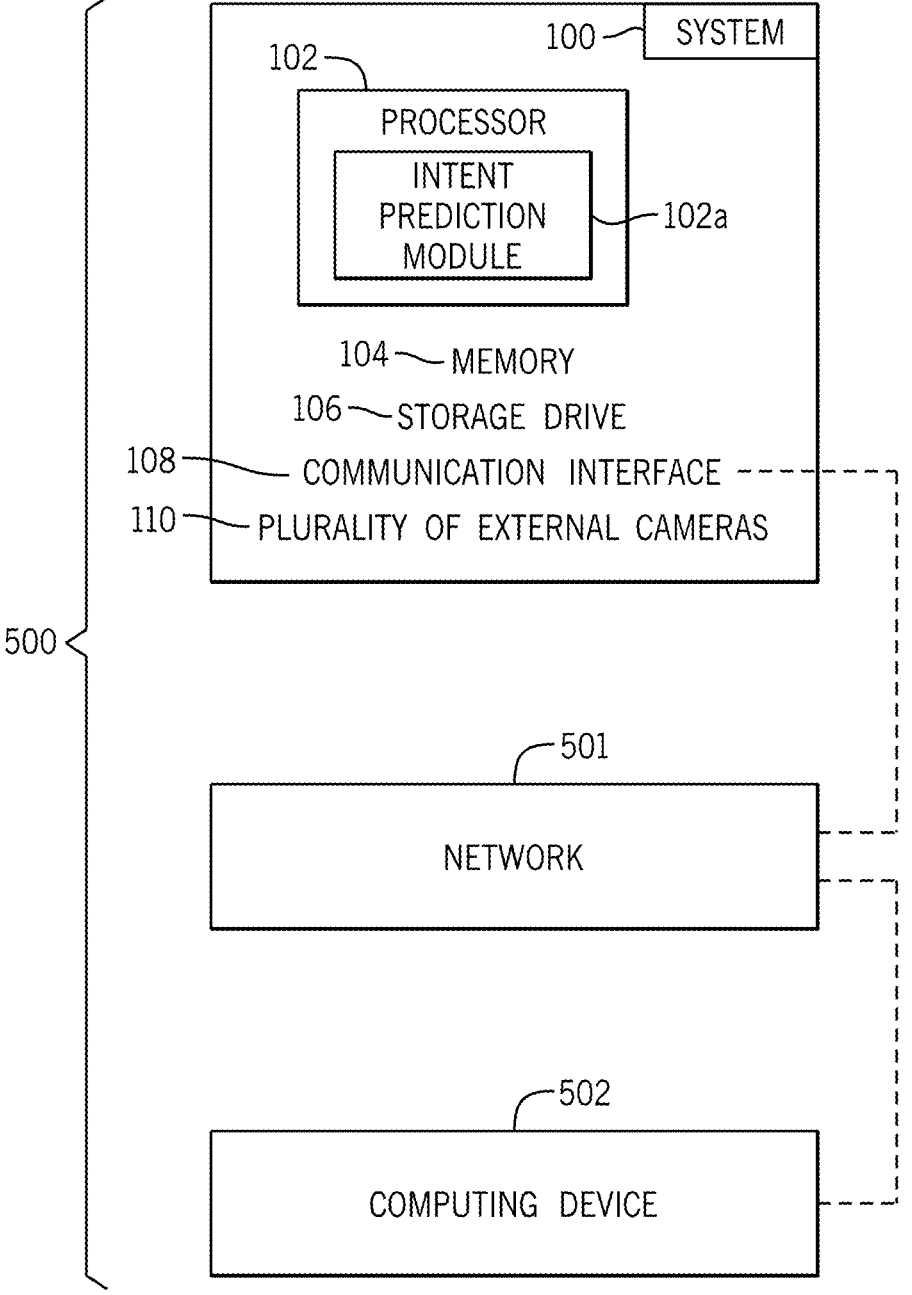
FIG. 5 is an illustration of an example computing environment where one or more of the provisions set forth herein are implemented, according to one aspect.

Furthermore, FIG. 5 and the following discussion provide a description of a suitable computing environment 500 to implement aspects of one or more of the provisions set forth herein. The system 100 includes the processor 102, memory 104, storage drive 106, and the communication interface 108. These components can be implemented onboard the vehicle 150 or controlled remotely through an external device such as a computing device 502 via a network connection 501. The operating environment illustrated in FIG. 5 is merely one example of a suitable operating environment and is not intended to suggest any limitation as to the scope of use or functionality of the operating environment. Example components and devices include, but are not limited to, onboard vehicle systems, remote control agents, and other similar computing environments.

Generally, aspects are described in the context of "computer readable instructions" being executed by one or more computing devices. Computer readable instructions may be distributed via computer readable media, as discussed below. These instructions can be implemented as program modules, such as functions, objects, Application Programming Interfaces (APIs), data structures, and the like, which perform one or more tasks or implement one or more abstract data types. Typically, the functionality of the computer readable instructions is combined or distributed as desired in various environments and, for example, stored in the memory 104 of the system 100 to be implemented by the processor 102.

The term "computer readable media" as used herein includes computer storage media. Computer storage media includes volatile and nonvolatile, removable, and non-removable media implemented in any method or technology for storage of information such as computer readable instructions or other data. The memory 104 and the storage drive 106 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the processor 102. Any such computer storage media is part of the system 100.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. For instance, the behavior prediction technology discussed herein is versatile, and could be extended to facilitating vehicle exits. Such systems, based on the principles of automatic car entry, could be adapted to create automatic car exit systems. This adaptation would involve integrating internal cameras within a vehicle to provide a continuous observation of exit behaviors, enabling the system to predict and respond to a user's intent to exit the vehicle. Also, various presently unforeseen or unanticipated alternatives, modifications, variations, or improvements therein may be subsequently made by those skilled in the art which are also intended to be encompassed by the following claims.

The invention claimed is:

1. A vehicle access control system for predicting a user's intent to enter a vehicle, comprising:

a plurality of external cameras mounted on the vehicle capturing video data of the user approaching the vehicle;

a processor including an intent prediction module utilizing a machine learning model; and a memory storing instructions that when executed by the processor enable the processor to:

analyze visual cues of the user from the video data through three distinct processing streams including trajectory analysis, head orientation analysis, and body orientation analysis;

extract user data including a trajectory, head orientation, and body orientation of the user from the video data using bounding box tracking across consecutive video frames, process the user data through the machine learning model trained on sequential time steps to generate probability distributions for each processing stream; and aggregate the probability distributions to calculate a final intent probability wherein the intent prediction module predicts an intent of the user to enter the vehicle based on the user data and triggers a vehicle entry action.

2. The system of claim 1, wherein the intent prediction module utilizes a machine learning model trained on a labeled dataset comprising instances of users entering and not entering vehicles.

3. The system of claim 1, wherein the processor analyzes the visual cues to extract the user data of the user using bounding box coordinates detected across consecutive video frames.

4. The system of claim 3, wherein the extraction of the trajectory includes calculating a walking pattern based on a movement of the user towards predefined points relative to the vehicle.

5. The system of claim 1, wherein the processor utilizes head pose estimation techniques to determine the gaze direction of the user towards specific parts of the vehicle, such as a door handle or interior.

6. The system of claim 5, wherein the video data is processed in a binary format, classifying the head orientation as either directed towards or away from the vehicle.

7. The system of claim 1, wherein the body orientation of the user is extracted using detection of key body points of a body of the user and calculating directional vectors between selected body points.

8. The system of claim 7, wherein the video data is processed in a binary format to reflect whether the body of the user is oriented towards the vehicle.

9. The system of claim 1, further comprising an actuator system configured to automatically perform the vehicle entry action, including unlocking the vehicle, opening a specific vehicle door of the vehicle, and/or opening a trunk of the vehicle, based on the predicted intent.

10. The system of claim 1, wherein the intent prediction module aggregates multiple probability distributions from different visual cues to calculate a final intent probability.

11. The system of claim 10, wherein the probability distributions are combined using a weighted average based on a reliability of each of the visual cues.

12. A computer-implemented method for predicting a user's intent to enter a vehicle, comprising:

capturing video data of the user approaching the vehicle using a plurality of external cameras mounted on the vehicle;

analyzing visual cues in the video data through parallel processing of trajectory data, head orientation data, and body orientation data;

extracting user data including a trajectory, head orientation, and body orientation from the video data using object detection and tracking across sequential video frames;

processing the user data through a trained machine learning model that generates separate probability assessments for each type of visual cue;

combining the probability assessments to determine a final intent prediction;

predicting an intent of the user to enter the vehicle based on the user data; and triggering an automatic vehicle entry action based on the intent of the user.

13. The method of claim 12, wherein predicting the user's intent includes using a machine learning model that processes the visual cues to predict whether the user intends to enter the vehicle.

14. The method of claim 13, further comprising updating the machine learning model using over-the-air updates to improve intent prediction accuracy based on newly collected data.

15. The method of claim 14, wherein the over-the-air updates are configured to regularly update the machine learning model by integrating data collected from similar vehicle systems in operation.

16. A vehicle comprising:

a plurality of external cameras mounted at locations around the vehicle for capturing video data;

a processor including an intent prediction module;

a memory storing one or more instructions that when executed by the processor enable the processor to:

analyze visual cues of a user from the video data, which include at least body posture, gaze direction, and proximity to the vehicle;

process sequential time steps of user position, head orientation, and body orientation through separate GRU encoders; and extract user data including trajectory, head orientation, and body orientation data from the video data, wherein the intent prediction module utilizes the user data to predict an intent of the user to enter the vehicle; and a vehicle entry control system responsive to the intent prediction module, configured to automatically execute specific vehicle entry actions including unlocking doors, opening targeted vehicle doors, and/or opening the vehicle trunk based on the predicted intent.

17. The vehicle of claim 16, wherein the intent prediction module utilizes a machine learning model trained on a labeled dataset comprising instances of users entering and not entering vehicles.

18. The vehicle of claim 16, wherein the intent prediction module aggregates multiple probability distributions from the visual cues to calculate a final intent probability.

19. The vehicle of claim 18, wherein the probability distributions are combined using a weighted average based on a reliability of each of the visual cues.

20. The vehicle of claim 16, wherein the body orientation is extracted using detection of key body points and calculating directional vectors between selected body points.

* * * * *